3,070,624
GLYCYRRHETINIC ACID DIALKYLAMINOALKYL ESTERS

Lily Baxendale, London, and Siegfried Gottfried, Ilford, England, assignors to Biorex Laboratories Limited, London, England, a corporation of the United Kingdom
No Drawing. Filed Mar. 2, 1961, Ser. No. 92,788
Claims priority, application Great Britain Mar. 4, 1960
4 Claims. (Cl. 260—468.5)

The present invention is concerned with new esters of glycyrrhetinic acid and, more particularly, with N,N-dialkylamino alkanol esters of 18 β-glycyrrhetinic acid (also known as 18 β-glycyrrhetic acid).

The new esters according to the present invention may be represented by the general formula:

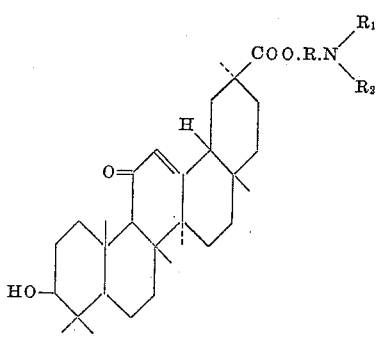

in which R is an alkylene radical containing 1–6 carbon atoms and $R_1$ and $R_2$ are alkyl radicals also containing 1–6 carbon atoms; and the acid addition salts and aquaternary ammonium compounds thereof.

The new esters are obtainable by first preparing the corresponding dialkylaminoalkyl halide salt of 18 β-glycyrrhetinic acid and then rearranging this salt by the method of Horenstein and Pahlicke (Berichte, 71, 1644/1938) to give the desired esters. Similar esters of the bile acids have been prepared, using the same method, by Ruzicka et al. (Helv., 27, 1553/1944).

The reaction by which the new esters are obtained is illustrated by the following equations in which X represents the glycyrrhetinic moiety and R, $R_1$ and $R_2$ have the same meaning as above.

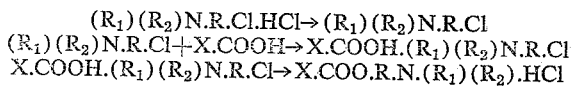

It is preferable to use a dialkylaminoalkyl chloride for the salt formation but the bromide may also be successfully used. The rearranging reaction, which proceeds quite rapidly at elevated temperatures, is preferably carried out in an alcoholic medium.

In order to prepare the quaternary ammonium compounds, the tertiary nitrogen atom may be quaternized or the corresponding quaternary compound may be used for the initial salt formation with glycyrrhetinic acid.

Preferred basic alkyl halide starting materials are diethylaminoethyl chloride hydrochloride and bromocholine bromide.

The following examples are given for the purpose of illustrating the present invention:

Example 1

17 g. diethylaminoethyl chloride hydrochloride were dissolved in 20 cc. cold water in a separating funnel. 20 cc. of a saturated solution of potassium carbonate was added and the mixture then extracted with 200 cc. diethyl ether. A small amount of brown glutinous material in the ether extract was filtered off and the ethereal solution of the free base dried over anhydrous potassium carbonate.

23.5 g. 18 β-glycyrrhetinic acid were suspended in 250 cc. cold isopropanol, which had been dried over anhydrous potassium carbonate, and the ethereal solution of the base added thereto. The mixture obtained was heated on a steam bath to remove the ether and then heated under reflux for 3 hours. The solution was then evaporated to half bulk and let to stand overnight. 25–30 g. crude product thereby crystallised out.

The crude product was purified by recrystallisation from absolute ethanol (ca. 10 cc./gram) to give about 25 grams of the pure ester hydrochloride: M.P. 268° C.; $[\alpha]_D^{20} + 136°$ in methanol (C.1%; 1.1).

Analysis (M.W. 606.32)—Calculated: C: 71.31%; H: 9.97%; N: 2.31%; Cl: 5.85%. Found: C: 70.94%; H: 9.73%; N: 2.51%; Cl: 5.66.

The infra-red spectrum of the compound showed a shift of the peak associated with the carboxy group in the carbonyl region:

18 β-glycyrrhetinic acid:5.91μ_____ 1692 cm.$^{-1}$
18 β-glycyrrhetinic acid methyl ester:5.81μ__ 1720 cm.$^{-1}$
18 β-glycyrrhetinic acid diethylaminoethyl
  ester hydrochloride:5.81μ_____ 1720 cm.$^{-1}$ This shift of 28 cm.$^{-1}$ towards the visible part of the spectrum is proof of the presence of an ester grouping in the molecule.

Using dimethylamino-ethyl chloride hydrochloride and glycyrrhetinic acid as starting materials, the corresponding ester hydrochloride was obtained.

The new esters according to the present invention are much more soluble in body fluids than glycyrrhetinic acid per se and possess valuable anti-inflammatory properties. They may be used for the treatment of those conditions for which the corresponding acyl derivatives, hemi-esters and hemi-ester salts of glycyrrhetinic acid are indicated (c.f. our copending United States application Serial No. 744,668, filed on June 26, 1958), i.e. they exhibit, inter alia, a marked anti-inflammatory activity and also inhibit the action of steroids and steroidal metabolism.

Example 2

4.7 g. 18 β-glycyrrhetinic acid were dissolved in 150 cc. isopropanol admixed with the exact equivalent of 2 N aqueous sodium hydroxide. 2.5 g. bromocholine bromide in 100 cc. isopropanol were then added and the resulting solution dried over anhydrous magnesium sulphate, filtered and boiled under reflux for 3 hours on a boiling water bath.

The reaction mixture was then evaporated to low bulk and allowed to crystallise. The crude crystalline material was filtered off with suction and recrystallised from n-butanol, light petroleum being added, if necessary.

The bromocholine ester of 18 β-glycyrrhetinic acid is obtained in the form of microcrystalline rhombs melting with decomposition at about 266–267° C.

A pure sample of the ester obtained contained the theoretical amount of ionizable bromine (12.55%). The new ester showed the same shift in the infra-red spectrum as the product of Example 1. This thus indicated the presence of an ester grouping in the molecule.

What is claimed is:

1. A pharmaceutically acceptable compound selected from the group consisting of 18 β-glycyrrhetinic acid dialkylaminoalkyl ester, acid addition salt of 18 β-glycyrrhetinic acid dialkylaminoalkyl ester, and methyl bromide adduct of 18 β-glycyrrhetinic acid dialkylaminoalkyl ester, the 18 β-glycyrrhetinic acid dialkylaminoalkyl ester having the formula

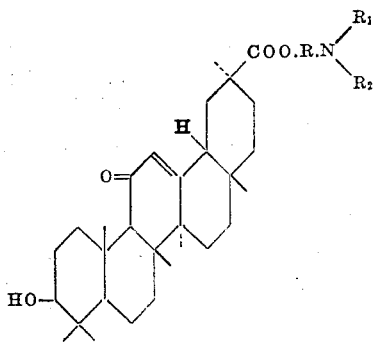

in which R is alkylene of from 1 to 6 carbon atoms and each of $R_1$ and $R_2$ is alkyl of from 1 to 6 carbon atoms.

2. 18 β-glycyrrhetinic acid dimethylaminoethyl ester.
3. 18 β-glycyrrhetinic acid diethylaminoethyl ester.
4. 18 β-glycyrrhetinic acid bromocholine ester.

References Cited in the file of this patent

Horenstein et al.: Ber. Deut. Chem. 71B, 1644–57 (1938).
Kariyone et al.: Chem. Abstracts, 33: 6334 (1939).
Ruzicka et al.: Helv. Chim. Octa., volume 27, 1553–60 (1944).
Benigni et al.: Chem. Abstracts, 52: 13876f (1958).